(12) United States Patent
Verschuren

(10) Patent No.: US 6,809,994 B2
(45) Date of Patent: Oct. 26, 2004

(54) METHOD FOR CONTROLLING RADIATION POWER OF DOMAIN EXPANSION TYPE MAGNETO-OPTICAL RECORDING MEDIUM

(75) Inventor: Coen Adrianus Verschuren, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 65 days.

(21) Appl. No.: 10/237,815

(22) Filed: Sep. 9, 2002

(65) Prior Publication Data

US 2003/0063504 A1 Apr. 3, 2003

(30) Foreign Application Priority Data

Sep. 12, 2001 (EP) .......................................... 01203438

(51) Int. Cl.⁷ .............................................. G11B 11/00
(52) U.S. Cl. .................................. 369/13.26; 369/13.09
(58) Field of Search .......................... 369/13.26, 13.27, 369/13.25, 13.24, 13.05, 13.06, 13.07, 13.08, 13.09, 116; 428/64.3, 694 MM, 694 ML

(56) References Cited

U.S. PATENT DOCUMENTS

| | | | | | |
|---|---|---|---|---|---|
| 5,428,586 A | * | 6/1995 | Kobayashi et al. | ...... | 369/13.02 |
| 5,463,600 A | * | 10/1995 | Kirino et al. | ............ | 369/13.24 |
| 5,757,735 A | * | 5/1998 | Fitzpatrick et al. | ...... | 369/13.54 |
| 6,192,008 B1 | * | 2/2001 | Kim | ........................ | 369/13.02 |
| 6,249,490 B1 | | 6/2001 | Miyaoka | ..................... | 369/13 |
| 6,385,141 B1 | * | 5/2002 | Tani et al. | ............... | 369/13.54 |
| 6,388,954 B1 | * | 5/2002 | Awano et al. | ............ | 369/13.02 |
| 6,477,118 B1 | * | 11/2002 | Awano et al. | ............ | 369/13.14 |
| 6,567,348 B1 | * | 5/2003 | Wakabayashi et al. | ... | 369/13.54 |
| 6,661,744 B2 | * | 12/2003 | Edanami | .................. | 369/13.27 |
| 6,700,837 B2 | * | 3/2004 | Verschuren | ............. | 369/13.09 |

FOREIGN PATENT DOCUMENTS

| | | |
|---|---|---|
| EP | 1056079 A2 | 11/2000 |
| JP | 215537 | 4/2000 |

OTHER PUBLICATIONS

Patent Abstracts of Japan, Hosoda Atsushi: "Magneto–Optical Reproducing Method and Magneto–Optical Reproducing Device" Publication No. 2001202668, Jul. 27, 2001, application No. 2000008809, Jan. 18, 2000.

* cited by examiner

Primary Examiner—Tan Dinh

(57) ABSTRACT

The present invention relates to a method, an apparatus and a record carrier for controlling radiation power and/or field strength during a reading operation from a magneto-optical recording medium comprising a storage layer and a read-out layer. An expanded domain leading to a pulse in a reading signal is generated in said read-out layer by copying a mark region from said storage layer to said read-out layer upon heating by said radiation power and by applying an external magnetic field. A pulse pattern in the reading signal is analyzed. The analyzing result is compared with run length characteristics of the data stored in said storage layer. The radiation power and/or the magnetic field strength are controlled on the basis of the comparison result. Thus, much less or no disc capacity has to be reserved for radiation power and/or magnetic field calibration, since the user data can be used for this purpose.

14 Claims, 2 Drawing Sheets

| w | PM | PS |
|---|---|---|
| w<b/2 | # | # |
| b/2<w<2.5b | # + 2 | # - 2 (#>2) |
| 2.5b<w<4.5b | # + 4 | # - 4 (#>4) |
| ⋮ | ⋮ | ⋮ |

METHOD FOR CONTROLLING RADIATION POWER OF DOMAIN EXPANSION TYPE MAGNETO-OPTICAL RECORDING MEDIUM

The present invention relates to a method and to an apparatus for controlling radiation power and/or field strength during reading of a magneto-optical recording medium comprising a recording or storage layer and an expansion or read-out layer, such as a MAMMOS (Magnetic AMplifying Magneto-Optical System) disk. The invention also relates to a magneto-optical recording medium for use by the method and in the apparatus according to the invention.

In magneto-optical storage systems the minimum width of the recorded marks is determined by the diffraction limit, that is, by the Numerical Aperture (NA) of the focussing lens and by the radiation wavelength. Therefore, a reduction of this width is generally based on shorter wavelength radiation and/or higher NA focussing optics. During magneto-optical recording the minimum bit length can be reduced to below the optical diffraction limit by using Laser Pulsed Magnetic Field Modulation (LP-MFM). In LP-MFM the bit transitions are determined by the switching of the field and the temperature gradient induced by the switching of the radiation source such as, for example, a laser. For read-out of the small crescent shaped marks recorded in this way, Magnetic Super Resolution (MSR) or Domain Expansion (DomEx) methods have to be used. These technologies are based on recording media with several magneto-static or exchange-coupled RE-TM layers. According to MSR, a read-out layer on a magneto-optical disk is arranged to mask adjacent bits during reading while, according to domain expansion, a domain in the centre of a spot is expanded. Because of the advantage of the domain expansion technique over MSR, bits with a length below the diffraction limit can be detected with a similar signal-to-noise ratio (SNR) as bits with a size comparable to the diffraction limited spot. MAMMOS is a domain expansion method based on magneto-statically coupled storage and read-out layers wherein a magnetic field modulation is used for expansion and collapse of expanded domains in the read-out layer.

In the above mentioned domain expansion techniques, like MAMMOS, a written mark from the storage layer is copied to the read-out layer upon laser heating by a radiation beam and by applying an external magnetic field. Due to the low coercitivity of this read-out layer, the copied mark will expand to fill the area of the optical spot and can be detected with a saturated signal level which is independent of the mark size. Reversal of the external magnetic field collapses the expanded domain. On the other hand, a space in the storage layer will not be copied and no expansion occurs.

The resolution of the MAMMOS read-out process, that is the smallest bit size that can be reproduced without interference from neighbouring bits, is limited by the spatial extent of the copy process (copy window) which is determined by the overlap of the temperature-induced coercivity profile and the stray field profile of the bit pattern which depends on the strength of the external magnetic field. The radiation power that is used in the read-out process should be high enough to enable copying. On the other hand, a higher radiation power also increases the overlap due to the fact that the coercivity Hc decreases and the stray field increases with increasing temperature. When this overlap becomes too large, correct read-out of a space is no longer possible, because false signals are generated by neighbouring marks. The difference between the maximum and the minimum allowed radiation power determines the power margin. This power margin decreases strongly with decreasing bit length. Experiments have shown that with the current read-out methods bit lengths of 0.10 μm can be correctly detected, i.e. at an extremely small power margin (in the range of 1 bit of a 16 bit Digital-to-Analog Converter). Hence, a good balance of the radiation power and the intensity of the external magnetic field is an important factor when selecting optimum operating conditions.

However, even if optimum conditions have been set during an initial stage of a reading operation, the initial balance may be disturbed during reading due to environmental changes. These environmental changes comprise field blurring, disk tilt, temperature changes, non-uniformities of the thickness of the protective coat of the disk, and influences of the slider movement on the magnetic head. Thus, controlling the radiation power and the magnetic field strength during read-out is essential.

JP-A-2000-215537 discloses a method and an apparatus for controlling the radiation power and/or the field strength of the external magnetic field. In the method disclosed in JP-A-2000-215537 information defining a prescribed section on the disk and pulse information defining a prescribed pulse number are read from a specific area on the disk. Next, the number of pulses contained in the information read from the prescribed section is counted and compared with the prescribed pulse number. Based on the result of the comparison, the radiation power or the field strength is adjusted. However, this solution requires a specific type of recording record with specific pre-recorded information in specific prescribed regions. Furthermore, the control can only be performed for the prescribed regions with a given number of pulses (that is marks).

It is an object of the present invention to provide a method, an apparatus and a record carrier for providing improved power and/or field control which enables adjustment during the whole read-out process.

This object is achieved by a method as claimed in claim 1 or 2, by an apparatus as claimed in claim 13 or 14, and by a record carrier as claimed in claim 17 or 19.

Accordingly, the use of the run length characteristics for evaluation of a misbalance between the external magnetic field and the radiation power, resulting in, for example, an excessive copy window size, provides the advantage that the radiation power and/or the field strength control can be performed based on normal user data recorded on the recording medium, that is, as long as the run-length constraints of the coding of the normal user data are known. Thus, a continuous control function is provided without requiring a modified or specially pre-recorded recording medium. Moreover, the control according to the invention has the additional advantage that it is a so called "running-control", that is the radiation power and/or the field strength control is performed while reading the user data without the need to perform a separate control step which would interrupt the reading of the user data.

According to an advantageous embodiment, a copy window size is determined in said comparison step, on the basis of which a control signal for said controlling step is generated. The copy window size is determined based on a detection of run length violations which may be determined by a pulse counting function or by a timer function. The copy window size determined may then be used to correct errors in the reading signal.

Preferably, the pulse pattern corresponds to the user data recorded on said recording medium. As an alternative, the pulse pattern corresponds to a test pattern with pre-defined mark and space run lengths recorded on said recording medium.

According to a further embodiment, the comparison step is performed based on a look-up table linking the copy window size to a corresponding number of false peaks or missing peaks in the pulse pattern.

According to a further embodiment, the control step comprises outputting a first control signal for coarse adjustment by radiation power control and a second control signal for fine adjustment by field strength control.

According to a further embodiment, a control information used in said controlling step is provided on the recording medium. This control information defines a medium-related characteristic between copy window size and radiation power data.

Other advantageous embodiments are defined in the dependent claims.

The present invention will be described hereinafter on the basis of preferred embodiments and with reference to the accompanying drawings in which.

Figures 1, 3:
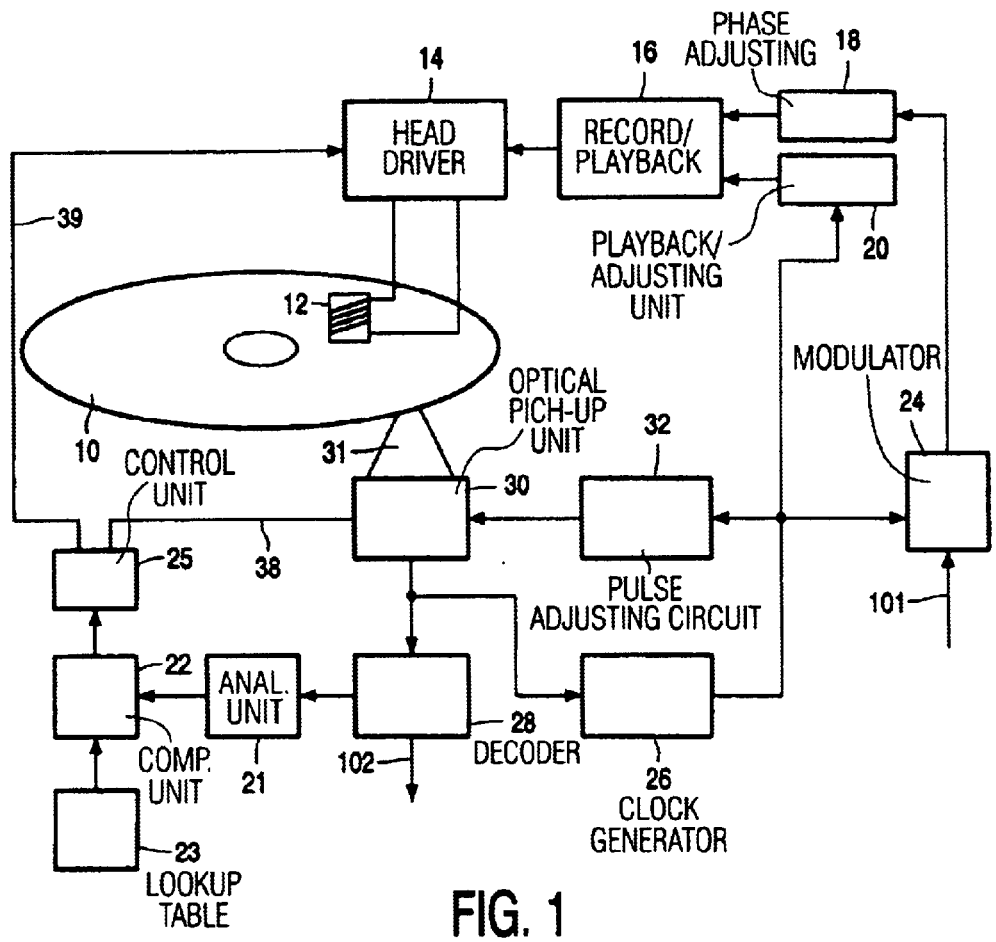
FIG. 1 shows a diagram of a magneto-optical disk player according to a preferred embodiment.
FIG. 3 shows a table for determining a range of spatial width of a copy window based on a mark or space run length determined.

A preferred embodiment will now be described on the basis of a MAMMOS disk player as indicated in FIG. 1.

FIG. 1 schematically shows a construction of a disk player according to a preferred embodiment. The disk player comprises an optical pick-up unit 30 having a radiating section comprising, for example, a laser light source, such as a laser diode, for irradiation of a magneto-optical recording medium 10, such as a magneto-optical disk, by a laser light radiation beam 31. The laser light has been converted, during recording, to pulses with a period synchronized with code data. The disk player also comprises a magnetic field applying section comprising a magnetic head 12 which applies, in a controlled manner, a magnetic field at the time of recording and playback to the magneto-optical disk 10. In the optical pick-up unit 30 the laser light source is connected to a laser driving circuit which receives recording and read-out pulses from a recording/read-out pulse adjusting unit 32 to thereby control the pulse amplitudes and timing of the laser in the optical pick-up unit 30 during a recording and/or read-out operation. The recording/read-out pulse adjusting circuit 32 receives a clock signal from a clock generator 26 which may comprise a PLL (Phase Locked Loop) circuit.

It is to be noted that in FIG. 1, for reasons of simplicity, the magnetic head 12 and the optical pickup unit 30 are shown on opposite sides of the disk 10. However, according to the preferred embodiment they should preferably be arranged on the same side of the disk 10.

The magnetic head 12 is connected to a head driver unit 14. It receives, at the time of recording, code-converted data from a modulator 24 via a phase adjusting circuit 18. The modulator 24 converts input recording data 101 to a prescribed code.

At the time of playback, the head driver 14 receives a clock signal, via a playback adjusting circuit 20, from the clock generator 26. The playback adjusting circuit 20 generates a synchronization signal for adjusting the timing and amplitudes of pulses applied to the magnetic head 12. A recording/playback switch 16 is provided for switching or selecting the respective signal to be applied to the head driver 14 at the time of recording and at the time of playback.

The optical pick-up unit 30 also comprises a detector for detecting the laser light reflected from the disk 10 and for generating a corresponding reading signal. This reading signal is applied to a decoder 28 which is arranged to decode the reading signal to generate output data 102. The reading signal generated by the optical pick-up unit 30 is also applied to a clock generator 26 in which a clock signal obtained from reading embossed clock marks on the disk 10 is extracted. This clock signal is applied, for synchronization purposes, to the recording pulse adjusting circuit 32, the playback adjusting circuit 20, and the modulator 24. In particular, a data channel clock may be generated in the PLL circuit of the clock generator 26.

During data recording, the laser source in the optical pick-up unit 30 is modulated with a fixed frequency corresponding to the period of the data channel clock. In this way, the data recording area (that is, the optical spot) on the rotating disk 10 is locally heated at equal distances. Furthermore, the data channel clock output by the clock generator 26 controls the modulator 24 to generate a data signal with a standard clock period. The recording data 101 are modulated and code-converted by the modulator 24 to obtain a binary runlength information corresponding to the information of the recording data.

The structure of the magneto-optical recording medium 10 may, for example, correspond to the structure described in JP-A-2000-260079.

The occurrence of false signals due to a large overlap (caused, for example, by a radiation power which is too high) should normally be avoided. However, when the correct data in the storage layer is known or can be deduced from coding constrains on that data, the occurrence and the number of false peaks gives direct information on the spatial width of the copy window which again is related to the thermal laser profile. This information can be used not only to correct the previous and/or subsequent data on the disc, but also provides a direct way to correct the radiation power and/or the field strength of the external magnetic field.

In the embodiment shown in FIG. 1, a control unit 25 is also provided to apply control signals 38, 39 to the head driver 14 and/or to the optical pickup unit 30. The control signal 39 applied to the head driver can be used to adjust the field current of a coil arrangement provided at the magnetic head so as to adjust the field strength or intensity of the external magnetic field. The control signal 38 applied to the optical pickup unit 30 can be used for adjusting the driving current to a laser source, or any other radiation source, so as to adjust the radiation power used for heating the disk 10. The two control signals 38,39 may be provided separately or, alternatively, as combined control signals. In the latter case the control signal 39 applied to the head driver 14 may be used for fine adjustment of the balance between the radiation power and the field strength, while the control signal 38 applied to the optical pickup unit 30 may be used for coarse adjustments. This is due to the fact that a change in the optical power influences both the stray field and the coercivity profile while a change in the external magnetic field only influences the total stray field.

The control unit 25 receives a comparison result of a comparing unit 22 which compares the result of an analysis of the read-out data obtained from the decoder 28 with reference data stored in a non-volatile memory, for example, a look-up table 23. The analyzing is performed by an analysis unit 21 which receives the read-out from the decoder 28.

Figure 2:
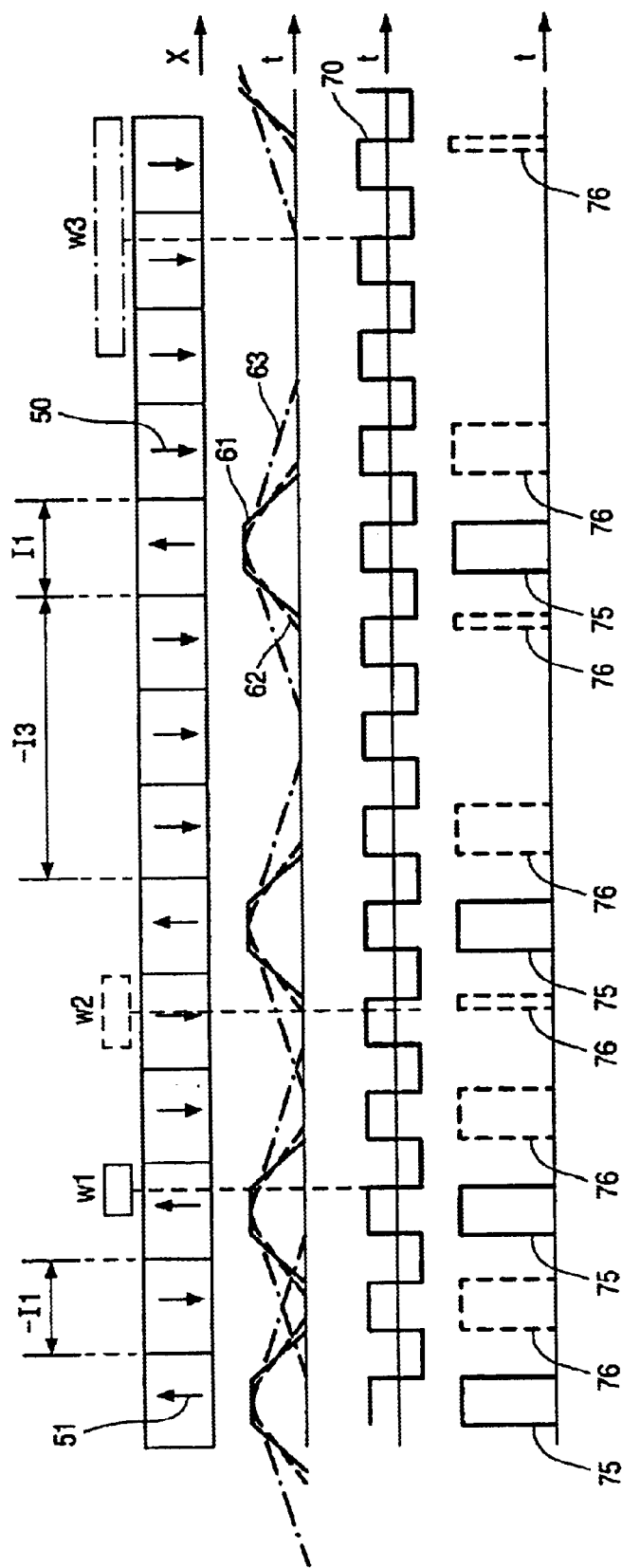
FIG. 2 shows signalling diagrams of a read-out strategy with different degrees of overlap.

FIG. 2 shows signalling diagrams of a read-out strategy with different degrees of overlap. The upper graph schematically shows a spatial arrangement of magnetized regions on a track of the disk 10. By way of example, a disk comprising a range of space run lengths (-I1, -I2, -I3, -I4) separated by I1 marks is shown. A space corresponds to a downward magnetization (indicated by downward arrows 50) and a mark corresponds to an upward magnetization (indicated by upward arrows 51). The expression "-In" denotes a space run length with a duration corresponding to n channel bits, while the expression "In" denotes a mark run length with a duration corresponding to n channel bits.

The resultant time dependency of the overlaps 61, 62, 63 upon scanning with different copy window sizes w1, w2 and w3 are indicated in the second graph from above. Overlap 61 corresponds to a copy window size w1, while overlap 62 corresponds to a copy window size w2 and overlap 63 corresponds to a copy window size w3.

The lower graph in FIG. 2 indicates the resultant MAMMOS signals generated when an external magnetic field 70 is applied. The MAMMOS peaks 75, indicated by a solid line, result from a setting with a copy window size w1. The additional peaks 76, indicated by a dashed line, occur when a setting with a copy window size w2 is used.

In conventional systems, the copy window size should be smaller than half the channel bit length b, as applies to the copy window size w1 in FIG. 2. In this case, each mark channel bit will yield one MAMMOS peak and no peaks are generated for space channel bits. Thus, detection of m subsequent peaks indicates an Im mark run length, whereas s missing peaks indicate a -Is space run length. This situation is indicated by the solid lines 61, 75 in FIG. 2.

For larger copy window sizes, such as, for example, copy window size w2, additional MAMMOS peaks 76 will be generated for space regions near a mark region because of the larger overlap. This situation is indicated by the dashed lines 62, 76 in FIG. 2. For example, an I1 mark will now yield three MAMMOS peaks instead of a single one. Now, -I1 and -I2 spaces can no longer be detected. A -I3 space will show only one missing peak instead of three (a missing peak being defined as an area without a MAMMOS peak having a length of one channel bit length).

Even larger copy window sizes, having a size w between 2.5b and 4.5b (2.5b<w<4.5b; b being the channel bit length) such as, for example, copy window size w3, cause a difference of four peaks in space and mark run length detection, while a -I5 space is the smallest space run length that can be detected (by one missing peak).

FIG. 3 shows a table summarizing the effect of different copy window sizes w on the number of peaks PM during a mark run length and on the number of missing peaks PS during a space run length which are detected at predetermined run lengths #. When the window size w is smaller than half the channel bit length b (that is w<b/2), the number of detected peaks PS and the number of missing peaks PS of the read-out data correspond to the run length # of the recorded information. For example, a mark run length of I5 will result in 5 MAMMOS peaks PM while a space run length of -I5 will result in 5 missing peaks PS (again, a missing peak being defined as an area without a MAMMOS peak having a length of one channel bit length). When the copy window size w is in the range between b/2 and 2.5b (that is b/2<w<2.5b), the number of detected peaks PM equals the mark run length # plus two while the number of missing peaks PM equals the space run length # minus two (provided that the space run length is three or more). Referring to the example above, a mark run length of I5 will now result in 7 MAMMOS peaks PM while a space run length of -I5 will now result in only 3 missing peaks PS. This sequence is continued; when the copy window size w is in the range between 2.5b and 4.5b, the number of detected peaks PM equals the mark run length # plus four while the number of missing peaks PM equals the space run length minus four, and so on.

The actual values in a table as shown in FIG. 3 might differ for different read and/or write strategies. However, these actual values can be derived by a person skilled in the art from the teachings disclosed above with reference to FIG. 2.

Using a table as shown in FIG. 3, a measurement of the copy window size can be performed in comparing unit 22; on the basis of the comparison result the field strength and/or the radiation power is controlled using the control signals 38, 39 generated by the control unit 25. Since the copy window size increases with increasing radiation power, it is possible to perform radiation power and/or magnetic field control during read-out, for example, by detection of run length violations in the written data. This detection can be done by using a test area with predefined mark and space run lengths. However, the detection is preferably done on user data since much less or no disc capacity has to be reserved for power calibration purposes. Moreover, when the correct copy window size has been determined, the previous data stream of peaks and of missing peaks can be translated into correct run length data using the table information of FIG. 3. This table information may be stored in the look-up table 23. In this way, the effects of environmental fluctuations, for example, fluctuations in the ambient temperature, the external field strength (coil to disc distance), and even mild variations in disc properties, can be corrected for on the fly.

The run length violations are determined by the analyzing unit 21. This determination is, for example, based on a determination of the number of peaks in the read-out signal by a pulse counting function. Alternatively, this determination is based on a measurement of the space periods in the read-out signal by a timer function.

Assuming a (d,k)=(0,6) RLL modulation, which means that the lengths of the smallest marks and of the smallest spaces are I1 and -I1 while the lengths of the largest marks and of the largest spaces are I7 and -I7, respectively. When the smallest mark run length in a data sequence observed by the analyzing unit 21 is larger than 1, the comparing unit 22 determines a correction. When, for example, the smallest mark run length in a data sequence observed is 3 successive peaks PM, the comparing unit 22 determines a correction of 2 peaks and thus a copy window size w between b/2 and 2.5b. When the largest allowed space run length (-I7) shows, for example, only 3 missing peaks PS instead of 7, the comparison unit 22 determines a correction of 4 peaks and a copy window size w between 2.5b and 4.5b. It is noted that for such a relatively large copy window, only -I5 and larger space run lengths can be detected and corrected. This demonstrates the need for rather tight radiation power control. In both above examples the radiation power and/or the field strength should be reduced by a corresponding amount which is determined in the control unit 25 on the basis of the comparison results. The run length characteristics of the modulation may be preset in the analyzing unit 21 or in the look-up table 23. The run length characteristics of the modulation may be based on information provided on and read from the disk 10 or, alternatively, on input by an input function in the disk player.

For even better control of the radiation power, a look-up table and/or a number of algorithm parameters are prerecorded on the disc 10 at a predetermined area. The look-up table stores a predetermined copy window vs laser power characteristic of the disk 10. This look-up table, or the algorithm parameters, is read from the disk and used by the control unit 25 to generate the control signals 38, 39. For relatively high linear velocities (for example, in Constant-Angular-Velocity operation or at different read-out speeds), the laser power should be increased with the linear velocity to reach appropriate temperatures on the surface of the disk 10. Therefore, the table could also include the disk radius as a variable or, alternatively, a radiation power interpolation scheme between inner and outer radius of the disk 10.

The present invention can be applied to any reading system for domain expansion magneto-optical disk storage systems. The functions of the analyzing unit 21, the comparing unit 22, the look-up table 23 and the control unit 25 may be combined into a single unit which may be a hardware unit or a processor unit controlled by a corresponding control program. The control signals 38,39 may be applied only to head driver 14, only to the optical pickup unit 30, or to both. The read-out data may alternatively be applied directly from the optical pickup-unit 30 to the analyzing unit 21. The preferred embodiments may thus vary within the scope of the attached claims.

What is claimed is:

1. A method of controlling radiation power during a reading operation from a magneto-optical recording medium (10) comprising a storage layer and a read-out layer, wherein an expanded domain leading to a pulse in a reading signal is generated in said read-out layer by copying a mark region from said storage layer to said read-out layer upon heating by said radiation power, said method comprising an analyzing step for analyzing a pulse pattern in said reading signal;

a step for comparing the result of said analysing step with a run length characteristic of the data stored in said storage layer; and a controlling step for controlling said radiation power on the basis of the comparison result.

2. A method as claimed in claim 1, wherein a copy window size is determined in said comparison step, on the basis of which a control signal for said controlling step is generated.

3. A method as claimed in claim 2, wherein said copy window size is determined on the basis of a detection of run length violations.

4. A method as claimed in claim 3, wherein said run length violations are determined by a pulse counting function or by a timer function.

5. A method as claimed in claim 2, wherein said copy window size determined is used to correct errors in the reading signal.

6. A method as claimed in claim 1, wherein said pulse pattern corresponds to user data recorded on said recording medium (10).

7. A method as claimed in claim 1, wherein said pulse pattern corresponds to a test pattern with predetermined mark and space run lengths on said recording medium (10).

8. A method as claimed in claim 1, wherein said comparing step is performed on the basis of a look-up table linking a copy window size to a corresponding number of false peaks or missing peaks in said pulse pattern.

9. A method as claimed in claim 1, wherein said controlling step comprises outputting a first control signal for controlling the radiation power control and a second control signal for controlling the magnetic field strength.

10. A method as claimed in claim 1, also comprising the step of reading from said recording medium (10) a control information for use in said controlling step.

11. A method as claimed in claim 10, wherein said control information defines a medium-related characteristic between a copy window size and the radiation power.

12. A reading apparatus for controlling radiation power during a reading operation from a magneto-optical recording medium (10) comprising a storage layer and a read-out layer, wherein an expanded domain leading to a pulse in a reading signal is generated in said read-out layer by copying a mark region from said storage layer to said read-out layer upon heating by said radiation power, said apparatus comprising:

analyzing means (21) for analyzing a pulse pattern in said reading signal;

comparing means (22) for comparing the result of said analyzing by said analyzing means (21) with a run length characteristic of the data stored in said storage layer; and power control means (25) for controlling said radiation power based on the basis of the comparison result.

13. A reading apparatus as claimed in claim 12, also comprising storing means (23) for storing information defining a relationship between false or missing pulses of said pulse pattern and a copy window size.

14. An apparatus as claimed in claim 12, wherein said reading apparatus is a disk player for MAMMOS disks.

* * * * *